United States Patent
Kawamura

[11] Patent Number: 5,859,626
[45] Date of Patent: *Jan. 12, 1999

[54] DISPLAY CIRCUIT WHICH AUTOMATICALLY DECIPHERS DIFFERENT VIDEO FORMATS AND OPTIMIZES THE HORIZONTAL AND VERTICAL CENTERING OF THE IMAGE ON THE DISPLAY

[75] Inventor: Akio Kawamura, Kanagawa, Japan

[73] Assignee: Sony Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 604,746

[22] Filed: Feb. 23, 1996

[30] Foreign Application Priority Data

Feb. 28, 1995 [JP] Japan ................................ 7-065181

[51] Int. Cl.$^6$ .............................. G09G 3/36; G09G 5/00
[52] U.S. Cl. ............................................. 345/99; 345/132
[58] Field of Search ................................. 345/3, 132, 99, 345/100, 213; 348/443, 555, 556, 558; 315/364

[56] References Cited

U.S. PATENT DOCUMENTS

| | | | |
|---|---|---|---|
| 5,021,719 | 6/1991 | Arai et al. | 315/364 |
| 5,285,197 | 2/1994 | Schmidt et al. | 345/213 |
| 5,335,023 | 8/1994 | Edwards | 345/100 |
| 5,341,172 | 8/1994 | Nio et al. | 348/443 |
| 5,406,308 | 4/1995 | Shiki | 345/132 |
| 5,534,940 | 7/1996 | Sato et al. | 348/556 |
| 5,579,029 | 11/1996 | Arai et al. | 345/132 |
| 5,592,187 | 1/1997 | Zenda | 345/3 |

Primary Examiner—Jeffery Brier
Assistant Examiner—Paul A. Bell
Attorney, Agent, or Firm—Ronald P. Kananen

[57] ABSTRACT

A display device that is automatically operable with various types of standards of video signals has a display panel, a controller, and a timing generator. The display panel includes pixels arranged in the form of a matrix to form an image. The display panel also contains a built-in vertical scanning circuit that is operable in response to input timing signals and sequentially selects the respective rows of the pixels. Additionally, the display panel contains a built-in horizontal scanning circuit that is operable in response to input timing signals and distributes the various types of standards of the video signals provided from the exterior to the selected rows of the pixels, thereby displaying the image. The controller deciphers the standard of the video signal provided from the exterior and automatically supplies the adjustment information required for optimizing the picture. The timing generator generates the timing signals in accordance with the adjustment information and inputs them into the display panel, whereby the image that has been optimally adjusted based on the standard of the video signal is displayed.

19 Claims, 9 Drawing Sheets

PRIOR ART

FIG.11

DISPLAY CIRCUIT WHICH AUTOMATICALLY DECIPHERS DIFFERENT VIDEO FORMATS AND OPTIMIZES THE HORIZONTAL AND VERTICAL CENTERING OF THE IMAGE ON THE DISPLAY

BACKGROUND OF THE INVENTION

The present invention relates to a display device having an active-matrix display panel containing a vertical scanning circuit and a horizontal scanning circuit, and also having a timing generator and the like that supplies controlling timing signals to the display panel. More particularly, the invention relates to an improvement in making adjustments to the linearity, the center position, and the like, of a picture on the display panel.

A brief explanation will now be given of an example of a display device with reference to FIG. 10. The display panel for the display device has a plurality of gate lines X arranged in the form of rows, a plurality of signal lines Y arranged in the form of columns, and a plurality of pixels PXL each arranged at the intersection between each gate line X and each signal line Y. The pixels PXL are formed of, for example, minuscule liquid crystal cells that are arranged in the form of a matrix to form a picture. Switching devices, such as thin film transistors Tr or the like, are integrated to drive the individual pixels PXL. Further, the display panel includes a vertical scanning circuit 101 that sequentially scans the respective gate lines X in the vertical direction in accordance with timing signals, such as vertical start signals VST and a vertical clock signal VCK and the like, so as to select the pixels PXL for one line at every one horizontal period. One vertical scanning operation is completed for one vertical scanning period. The display panel also has a horizontal scanning circuit 102 that sequentially scans the respective signal lines Y within one horizontal period in accordance with horizontal start signals HST and a horizontal clock signal HCK so as to sample a video signal Vsig supplied from a video line 103 and to write the sampled signal points into the selected pixels PXL for one line. More specifically, each signal line Y is connected to the video line 103 via a horizontal switch HSW so as to receive the video signal Vsig from the exterior. The horizontal scanning circuit 102, which is formed of a shift register, sequentially transmits the horizontal start signals HST based on the horizontal clock signal HCK so that it sequentially outputs sampling pulses to cause the respective horizontal switches HSW to sequentially open or close, thereby sampling the video signal Vsig onto the respective signal lines Y.

Figure 10:
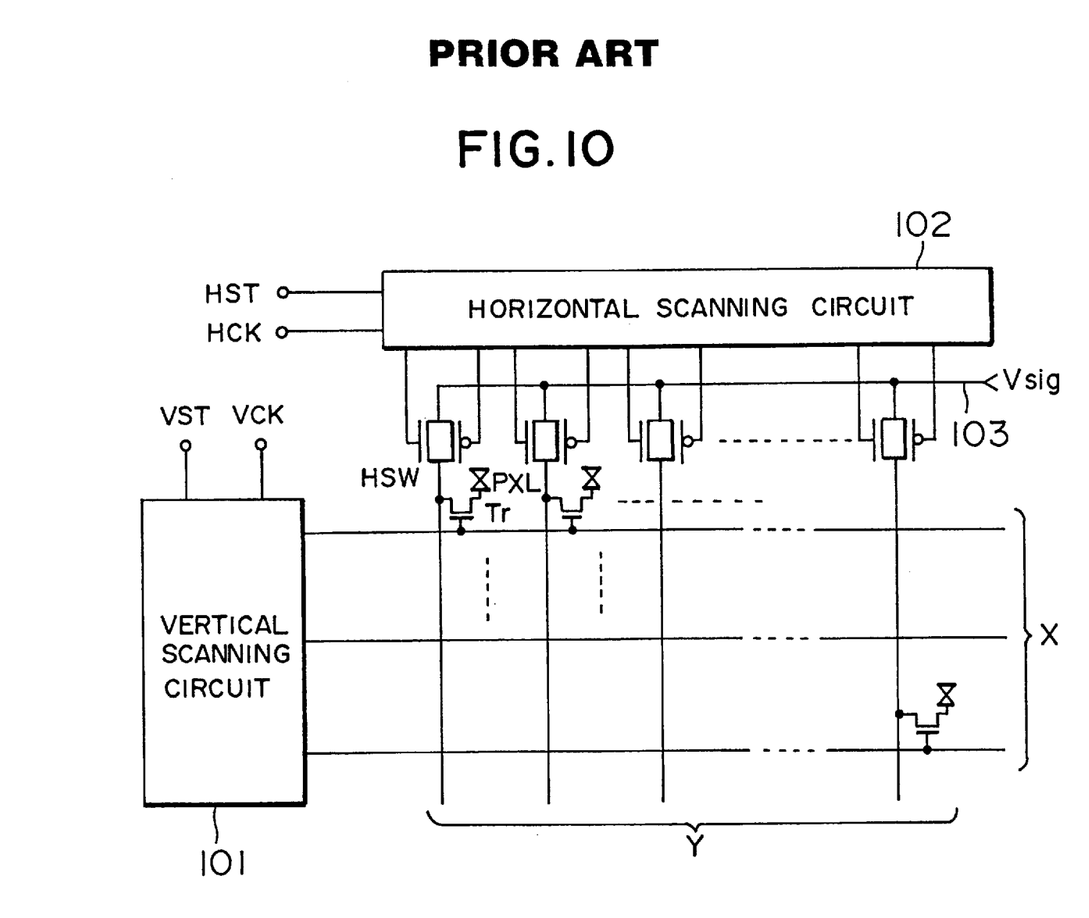
FIG. 10 is a block diagram of an example of a display panel.
Figure 11:
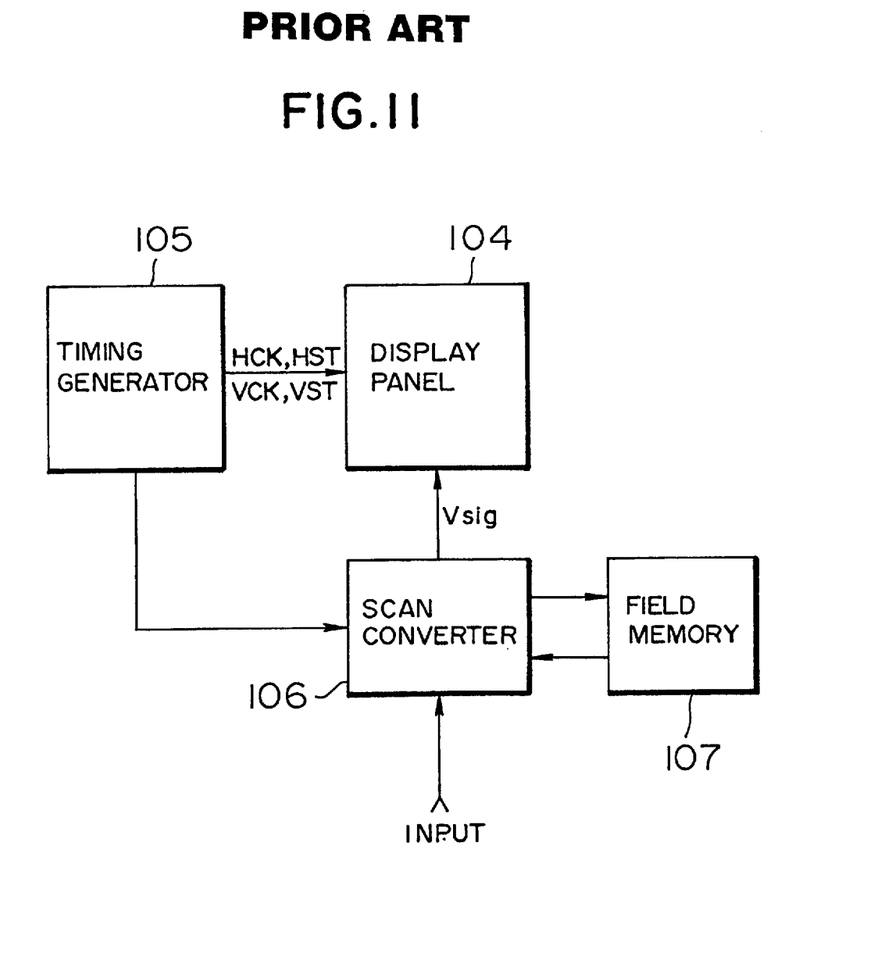
FIG. 11 is a block diagram of an example of a display device.

FIG. 11 is a schematic block diagram illustrating the construction of a display device by the application of the display panel shown in FIG. 10 to a display. A timing generator 105 is connected to a display panel 104 and supplies the above-described various types of timing signals HCK, HST, VCK, VST to the display panel 104. The display panel 104 is operated in response to the timing signals and sequentially provides video signals Vsig to the pixels, whereby a desired image can be displayed. There are a variety of standards for video signals that are input from the exterior. For example, there are about 100 types of various formats of VGA signals when the display panel is applied to a computer data display system or the like. However, the display panel 104 of this display device is operable only with the single or the limited few types of synchronizing signals. Video signals having different synchronizing signals from predetermined timing signals have their timings converted via a scan converter 106 and are then supplied to the display panel 104. For performing this conversion, a field memory 107 is provided for the display device. The writing timing and reading timing of the video signals into/from the field memory 107 are suitably adjusted so as to match the driving timing inherent in the display panel 104. This necessitates ICs for the scan converter 106 and ICs for the field memory 107, thus increasing costs of the display system.

SUMMARY OF THE INVENTION

In view of the foregoing problems inherent in the conventional technique, it is an object of the present invention to provide an improved display device that is automatically operable with various types of VGA signals and the like. The following measures are provided to achieve the above object. Namely, a display device of the present invention basically comprises a display panel having pixels arranged in a matrix form to display an image, a controller, and a timing generator. The display panel includes a vertical scanning circuit operable in response to a first input timing signal for sequentially selecting respective pixel rows, and a horizontal scanning circuit operable in response to a second input timing signals for distributing various standards of video signals provided from the exterior to the selected pixel rows, thereby producing a display.

The controller deciphers the standard of an incoming video signal and automatically supplies adjustment information required for optimizing the image. According to this adjustment information, the timing generator generates the timing signals and inputs them into the display panel, thereby providing an image that has been optimally adjusted based on the standard of the video signal. More specifically, the vertical scanning circuit receives a vertical clock signal and vertical start signals as the timing signals and sequentially transmits the vertical start signals in synchronization with the vertical clock signal, thereby sequentially selecting the respective pixel rows. For accomplishing this operation, the timing generator controls the phase of the vertical start signal in accordance with the adjustment information, thereby enabling automatic adjustments of the vertical center of the image. On the other hand, the horizontal scanning circuit receives a horizontal clock signal and horizontal start signals as the timing signals and sequentially transmits the horizontal start signals in synchronization with the horizontal clock signal, thereby distributing the video signals to the selected pixel rows. For achieving this operation, the timing generator controls the phase of the horizontal start signal in accordance with the adjustment information, thereby enabling automatic adjustments of the horizontal center of the image. Further, the timing generator exerts control over the period of the horizontal clock signal in accordance with the adjustment information, thereby making it possible to automatically adjust the circularity or linearity of the picture. For achieving this type of adjustment, the timing generator has a horizontal synchronous Phase-locked loop (PLL) circuit that includes a frequency demultiplier in order to generate the horizontal clock signal in synchronization with the horizontal synchronizing signal separated from the video signal. With this construction, the frequency dividing ratio of the frequency demultiplier is varied according to the adjustment information, whereby the period of the horizontal clock signal can be controlled.

According to the present invention, in the method of driving the display panel containing a built-in horizontal scanning circuit and a built-in vertical scanning circuit, the timing signals supplied to the display panel from the timing generator are adjusted to optimize the center position, the circularity or the linearity of the image. With this arrangement, the image display device is made operable with video signals having different synchronizing signals. More specifically, a communicating function is mounted on ICs of the timing generator for driving the display panel, whereby the timing generator can be controlled from the exterior by a controller, such as a microcomputer. For example, the timings, or phases, of the horizontal start signals and the vertical start signals are modulated, thereby enabling adjustments of the center position of the picture.

Also, the frequency dividing ratio of the frequency demultiplier provided for the horizontal synchronous PLL circuit that is built into the timing generator is made variable from the exterior, thereby making adjustments to the circularity or linearity of the image in the horizontal direction. In the manner described above, the picture display apparatus is automatically operable with various types of synchronous formats merely by using the timing generator. Namely, the timing generator is controlled by means of communications with the controller, such as a microcomputer or the like, whereby the horizontal start signals, the vertical start signals, the horizontal clock signal, and the like, can be modified.

BRIEF DESCRIPTION OF THE DRAWINGS

The present invention will become more clearly appreciated as the disclosure of the present invention is made with reference to the accompanying drawings wherein:

FIG. 5, consisting of FIGS. 5A and 5B, is a schematic view provided for explaining the operation of the same display device;

FIG. 9, consisting of FIGS. 9A and 9B, is a schematic view of examples of communication systems through which the controller and the timing generator contained in the display device shown in FIG. 1 are connected;

DETAILED DESCRIPTION OF THE PREFERRED EMBODIMENTS

Figure 1:
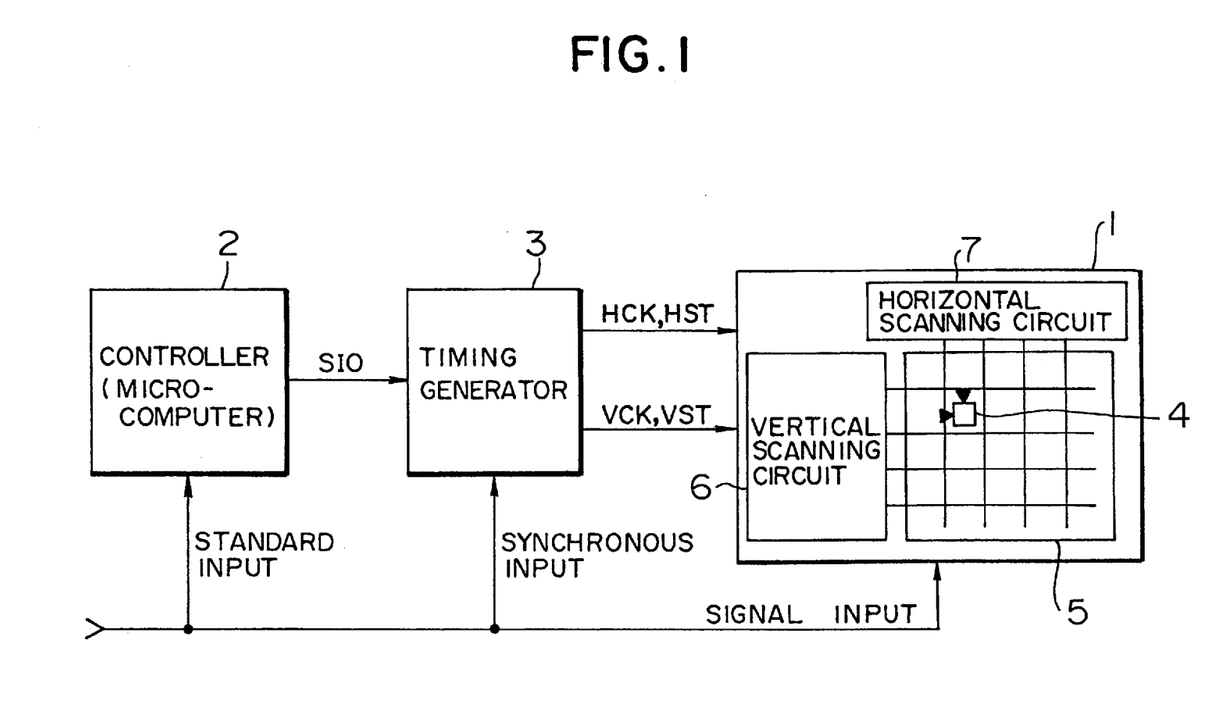
FIG. 1 is a block diagram of an embodiment of a display device according to the present invention.
Figure 2:
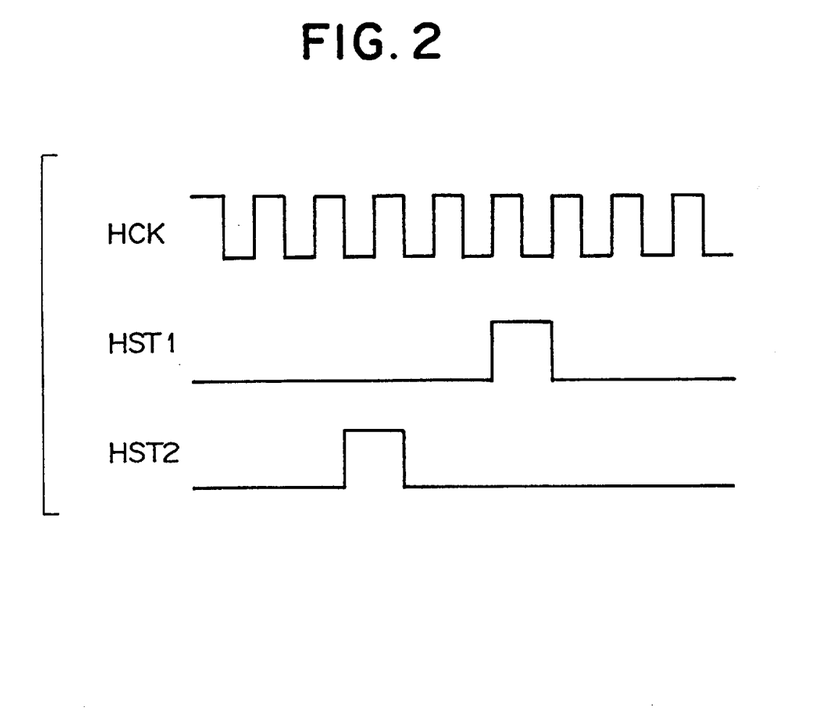
FIG. 2 is a timing chart provided for explaining the operation of the display device shown in FIG. 1.

A detailed description will now be given of a suitable embodiment of the present invention with reference to the drawings. FIG. 1 is a schematic block diagram of an embodiment of a display device according to the present invention. As illustrated in FIG. 1, the display device of the present invention comprises a display panel 1, a controller 2 formed of a microcomputer or the like, and a timing generator 3. The display panel 1 includes pixels 4 indicated by a matrix array to form an image 8 on an image frame 5. Also, the display panel 1 has a built-in vertical scanning circuit 6 that is operable in accordance with timing signals that are input from the timing generator 3 so as to sequentially select the respective rows formed by the pixels 4. The panel 1 further includes a horizontal scanning circuit 7 that is also operable in accordance with timing signals that are input from the timing generator 3 so as to distribute various standards of video signals provided from the exterior to the selected rows formed by the pixels 4, whereby an image 8 is displayed on an image frame 5. The display panel 1 constructed as described above is basically similar to the construction of the display panel shown in FIG. 10. The controller 2 deciphers the standard of the video signal provided from the exterior and, as a result, automatically supplies adjustment information required for optimizing the image 8 to the timing generator 3. For achieving this operation, the controller 2 and the timing generator 3 are connected with each other by means for communicating between the two components. For example, the two components are connected via a serial interface (SIO). A parallel interface may certainly be employed instead of the serial interface to establish communications between the two components. The timing generator 3 generates the above-described timing signals in accordance with the adjustment information supplied from the controller 2 and inputs them into the display panel 1. The above-described operation makes it possible to display the image 8 on the image frame 5 that has been optimally adjusted according to the various types of standards of video signals.

More specifically, the vertical scanning circuit 6 receives a vertical clock signal VCK and vertical start signals VST as timing signals and sequentially transmits the vertical start signals VST in synchronization with the vertical clock signal VCK, thereby sequentially selecting the respective rows formed by the pixels 4. For implementing this operation, the timing generator 3 exerts control over the phase of the vertical start signal VST in accordance with the adjustment information, thereby enabling automatic adjustments of the vertical center position of the picture. In contrast, the horizontal scanning circuit 7 receives a horizontal clock signal HCK and horizontal start signals HST as timing signals and sequentially transmits the horizontal start signals HST in synchronization with the horizontal clock signal HCK, thereby distributing the video signals to the selected rows formed by the pixels 4. For achieving this operation, the timing generator 3 exerts control over the phase of the horizontal start signal HST in accordance with the adjustment information, thereby enabling automatic adjustments of the horizontal center position of the picture. Further, the timing generator 3 controls the period of the horizontal clock signal HCK in accordance with the adjustment information, thereby making it possible to automatically adjust the circularity or relative linearity of the picture. For achieving this type of adjustment, the timing generator 3 is provided with a horizontal synchronous PLL circuit including a frequency demultiplier in order to produce the horizontal clock signal HCK in synchronization with horizontal synchronizing signals separated from the video signal. The frequency dividing ratio of the frequency demultiplier is varied in accordance with the adjustment information, thereby controlling the period of the horizontal clock signal HCK.

The operation of the display device shown in FIG. 1 will now be explained in detail with reference to FIGS. 2 to 5. A reference will first be made to FIG. 2 for explaining the operation of the adjustment of the horizontal center. As discussed above, the timing generator 3 generates the horizontal clock signal HCK to supply it to the horizontal scanning circuit 7 of the display panel 1 and at the same time, generates the horizontal start signal HST to supply it to the horizontal scanning circuit 7. Prior to this operation, the timing generator 3 makes adjustments to the phase of the horizontal start signal HST as required in accordance with the adjustment information that has been input from the controller 2. In the example of this operation illustrated in FIG. 2, HST1 indicates the phase of the signal before the adjustment, and HST2 denotes the phase of the signal after the adjustment.

Figure 3:
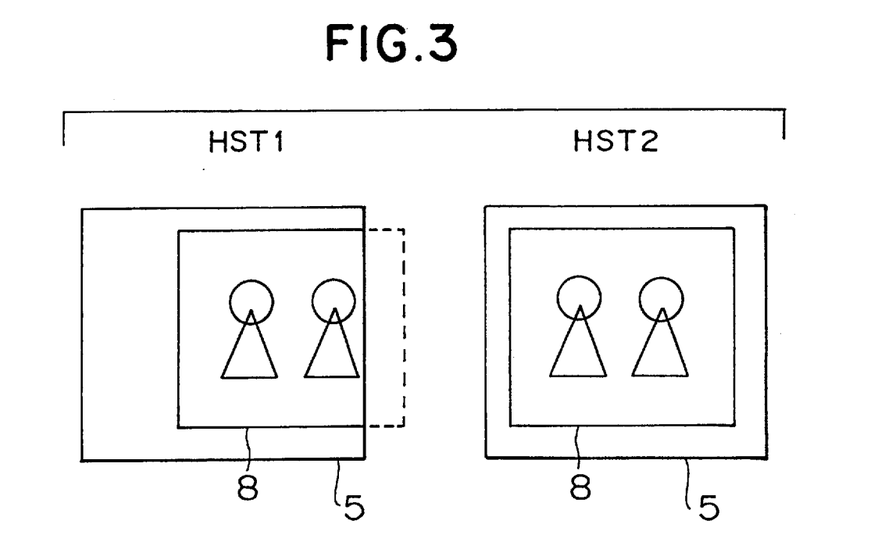
FIG. 3 is a schematic view provided for explaining the operation of the same display device.

FIG. 3 illustrates the display state of the image 8 on the image frame 5 of the display panel 1 shown in FIG. 1. Upon sampling of the video signal in accordance with the HST1 before the adjustment, the horizontal center of an image 8 is displaced in the rightward direction. For correcting this displacement, the HST2 is allowed to lead the HST1 so that the sampling starting point can be shifted to the left-hand side of the picture 5. By virtue of this shifting operation, the image 8 can be positioned at the center of the picture 5. Similarly, in this manner the center position of the image 8 in the horizontal direction can be optimized.

Figure 4:
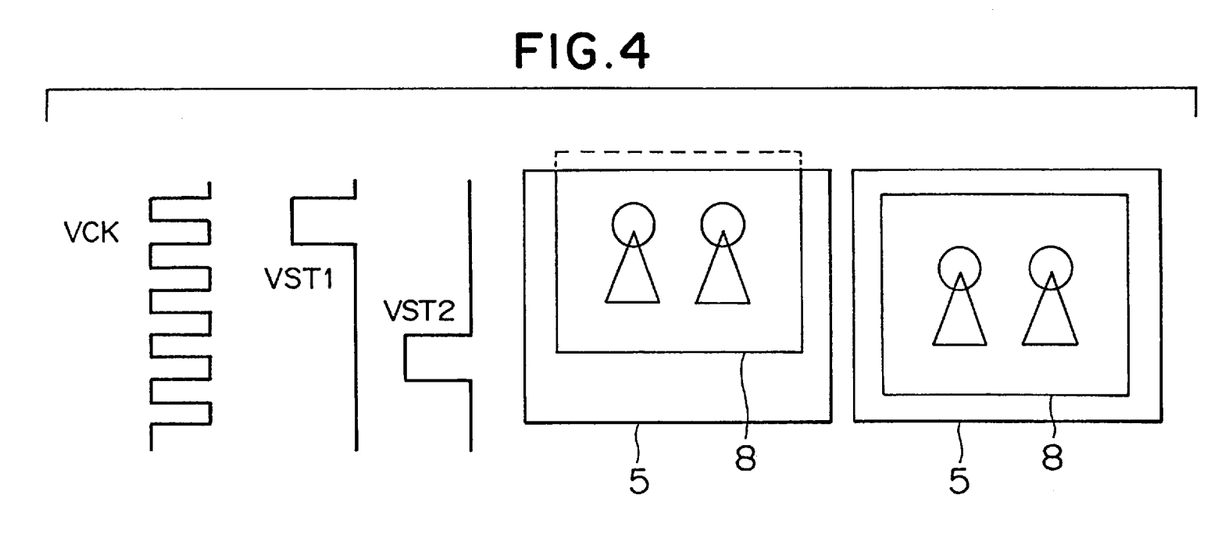
FIG. 4 is a timing chart and a schematic view provided for explaining the operation of the same display.

FIG. 4 indicates the operation of the adjustment of the vertical center. As discussed above, the timing generator 3 generates the vertical clock signal VCK to input it into the vertical scanning circuit 6 and at the same time, supplies the horizontal start signal VST to the vertical scanning circuit 6. VST1 denotes the phase state before the adjustment, while VST2 represents the phase state after the adjustment. VST1 is input into the vertical scanning circuit 6, with the result that the center position of the image 8 is displaced upward. For correcting this displacement, VST2 is created according to the given adjustment information and is supplied to the vertical scanning circuit 6. In response to this correction, the image 8 displayed on the image screen 5 is displaced downward, thereby optimizing the center position in the vertical direction.

Figure 5A:
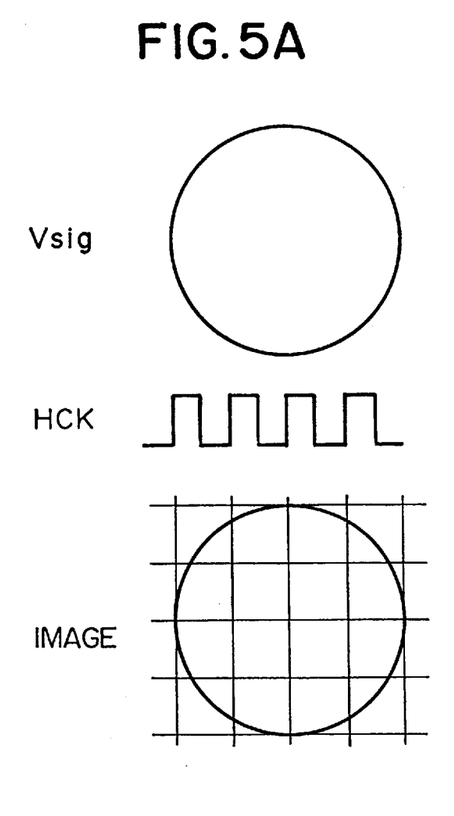
Figure 5B:
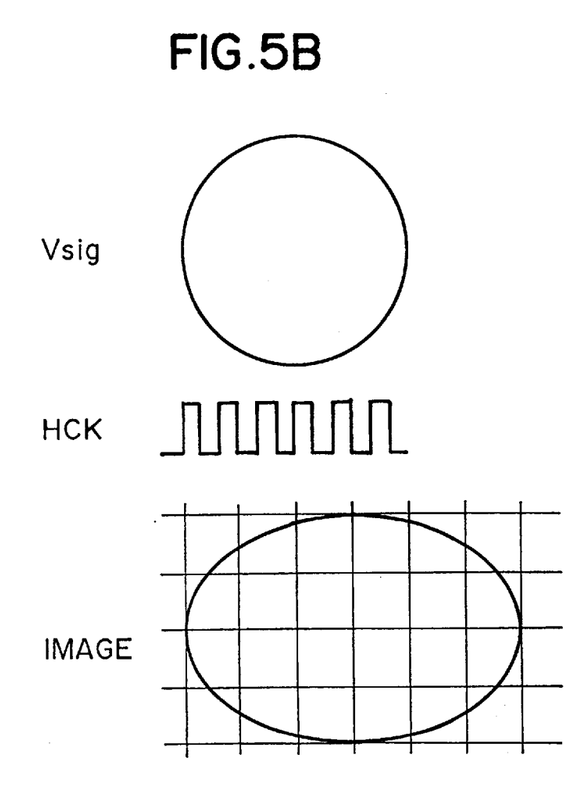

A detailed explanation will now be given of the operation of the adjustment of the circularity or linearity with reference to FIG. 5. For example, it is now assumed that a video signal Vsig containing a circular pattern is supplied to the display panel 1. Meanwhile, the period of the horizontal clock signal HCK has been adjusted suitably in accordance with the adjustment information that has been input to the timing generator 3. FIG. 5A illustrates the state after the adjustment has been made in which the frequency of the horizontal clock signal HCK has been adjusted to be comparatively low. The circular pattern contained in the video signal Vsig has been sampled in synchronization with four pulses of the horizontal clock signal HCK. It should be noted that the number of pulses of the horizontal clock signal HCK has been determined for simple explanation only, in reality, however, it is greater than four. FIG. SB illustrates the state before the adjustment has been made in which the frequency of the horizontal clock signal HCK is too high. Based on this state, the circular pattern contained in the video signal Vsig has been sampled in accordance with seven pulses of the horizontal clock signal HCK. As shown in FIG. 5A, the circular pattern sampled in accordance with the horizontal clock signal HCK that has been adjusted at a comparatively-low frequency is indicated substantially as real as the original form. On the other hand, the circular pattern sampled in accordance with the horizontal clock signal HCK having a high frequency is displayed in the form of an elongated acircular image in the horizontal direction. In this manner, according to the present invention, the circularity or linearity of the image in the horizontal direction can be adjusted or corrected as desired merely by modulating the frequency or period of the horizontal clock signal HCK. Similarly, the circularity or linearity of the picture in the vertical direction can be adjusted or corrected as desired by modulating the frequency of the vertical clock signal VCK.

Figure 6:
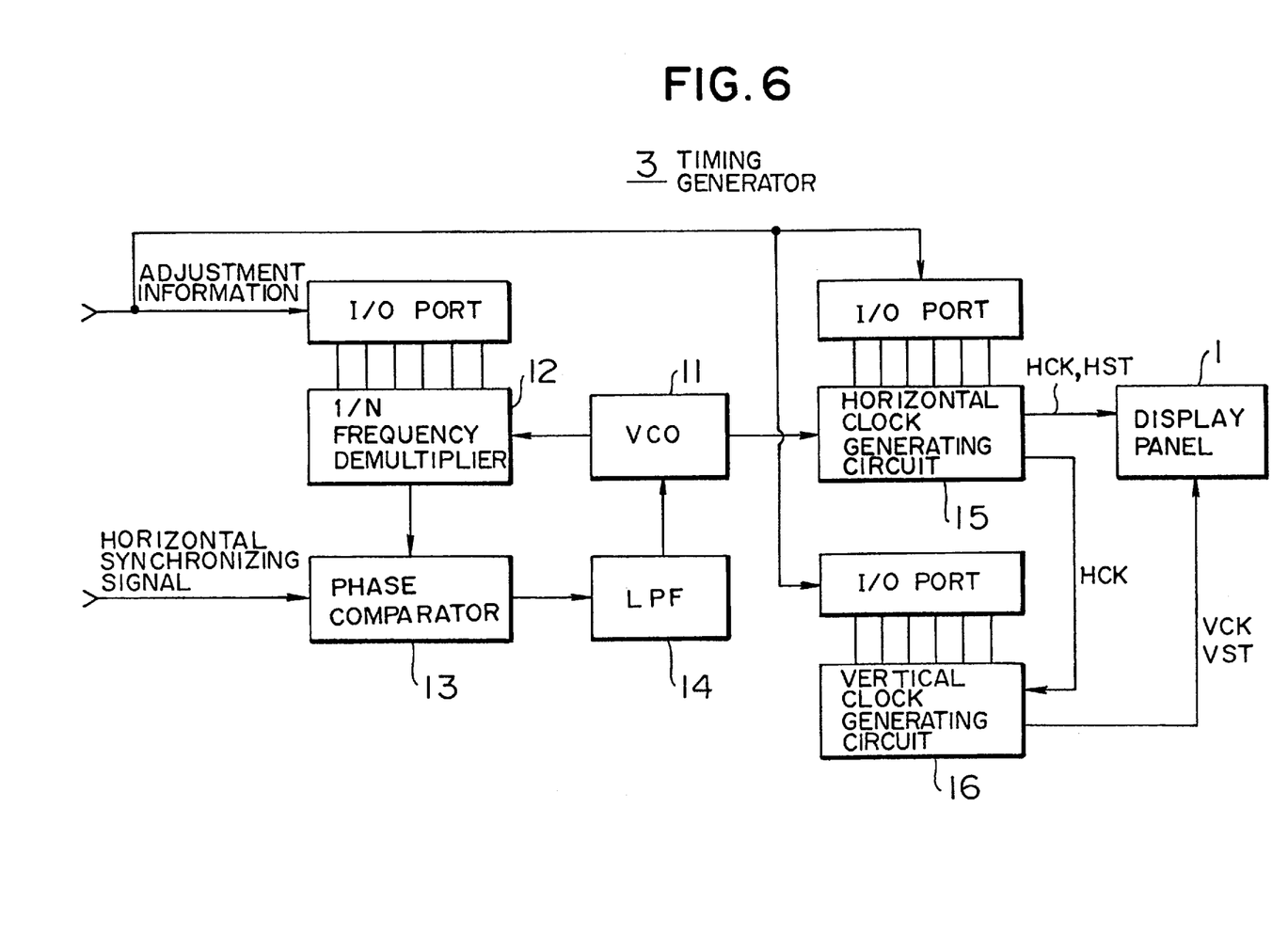
FIG. 6 is a block diagram of an example of the specific construction of a timing generator contained in the display device shown in FIG. 1.

FIG. 6 is a block diagram illustrating an example of the specific construction of the timing generator 3 shown in FIG. 1. The timing generator 3 is provided with a horizontal synchronous PLL circuit in order to generate a master clock serving as a reference signal. This PLL circuit is formed of a phase-locked closed loop comprising a voltage-controlled oscillator (VCO) 11, a 1/N frequency demultiplier 12, a phase comparator 13 and a low pass filter (LPF) 14. The timing generator 3 includes a horizontal clock generating circuit 15 that processes the master clock output from the PLL circuit and supplies the horizontal clock signal HCK and the horizontal start signals HST to the display panel 1. The timing generator 3 also contains a vertical clock generating circuit 16 that processes the horizontal clock signal HCK supplied from the horizontal clock generating circuit 15 and generates the vertical clock signal VCK and the vertical start signals VST so as to supply them to the display panel 1. The master clock generated in the VCO 11 is divided into 1/N by the frequency demultiplier 12. The phase comparator 13 compares the output of the frequency demultiplier 12 with the phase of the horizontal synchronizing signal. This horizontal synchronizing signal has been separated and extracted from the video signal that had been input from the exterior. The output of the phase comparator 13 is converted via the LPF 14 to an error signal which is then fed back to the VCO 11, whereby the oscillation frequency of the signal is adjusted. As a consequence, the master clock whose phase has been locked onto the horizontal synchronizing signal is generated.

The present invention is characterized in that the 1/N frequency demultiplier 12 receives adjustment information from the controller via an I/O port. The horizontal clock generating circuit 15 and the vertical clock generating circuit 16 also receive predetermined adjustment information via the respective I/O ports. In this frequency demultiplier 12, the frequency dividing ratio can be varied in accordance with the adjustment information, whereby the period of the master clock can be adjusted. This further makes it possible to indirectly adjust the period of the horizontal clock signal HCK based on this master clock. Moreover, the horizontal clock generating circuit 15 can exert control over the phase of the horizontal start signal HST, thereby making automatic adjustments to the horizontal center position of the picture. The vertical clock generating circuit 16 also exerts control over the phase of the vertical start signal VST in accordance with the adjustment information, thereby enabling automatic adjustments to the vertical center position of the picture.

Figure 7:
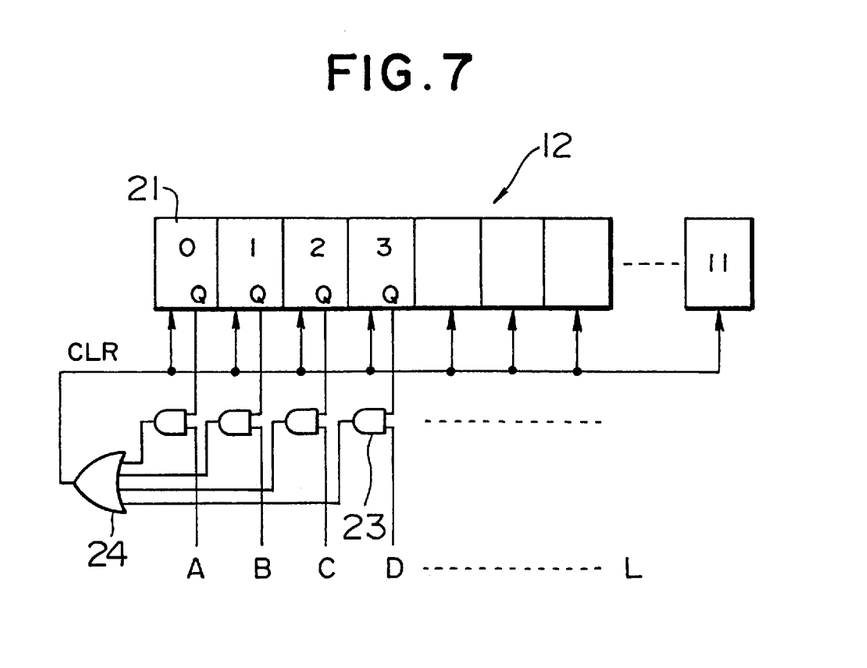
FIG. 7 is a block diagram of an example of the specific construction of a frequency demultiplier contained in the timing generator shown in FIG. 6.

FIG. 7 is a schematic block diagram illustrating an example of the specific construction of the frequency demultiplier 12 contained in the timing generator 3 shown in FIG. 6. As illustrated in FIG. 7, the variable frequency demultiplier 12 is formed of a plurality of stages of a binary counter 21 connected with each other. A clear signal CLR is input into one of the stages of the binary counter 21, whereby a desired frequency dividing ratio can be set. Data items for specifying a stage to receive the clear signal CLR are indicated by A, B, C, D, . . . , L, respectively. For example, it is now assumed that the data item D is set to be 1, while the remaining data items A, B, C, E, . . . , L are set to be 0. With this arrangement, during the frequency dividing operation by the plurality of connectedstages of the binary counter 21, an output appears at the Q terminal of the stage No. 3 of the binary counter 21, and at the same time, the clear signal CLR is input into the reset terminal of the stage No. 3 of the binary counter 21 via gate devices 23 and 24. In this manner, the data items A, B, C, . . . , L are set as required, whereby the frequency dividing ratio of the frequency demultiplier 12 can be variously set.

Figure 8:
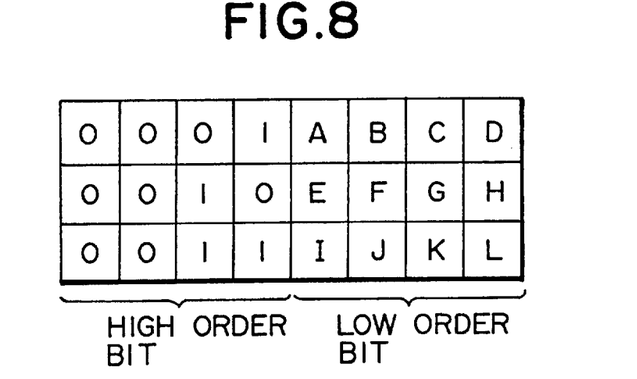
FIG. 8 illustrates a table representing an example of a data format of adjustment information supplied to the frequency demultiplier.

FIG. 8 illustrates one example of a format representing adjustment information supplied from the controller 2 to the frequency demultiplier 12 provided for the timing generator 3. In this example, 8-bit data is transmitted to the I/O port of the frequency demultiplier 12 from the controller 2. The high order four bits indicate addresses of the respective stages of the binary counter 21, while the low order four bits represent data. In the manner described above, the frequency dividing ratio of the PLL circuit is programmable through communications. In a similar manner, adjustment information can also be supplied to the horizontal clock generating circuit 15 and the vertical clock generating circuit 16. With this arrangement, it is possible to select the number of effective series stages of the binary counter used for determining the phases of the horizontal start signals HST and the vertical start signals VST.

Figure 9A:
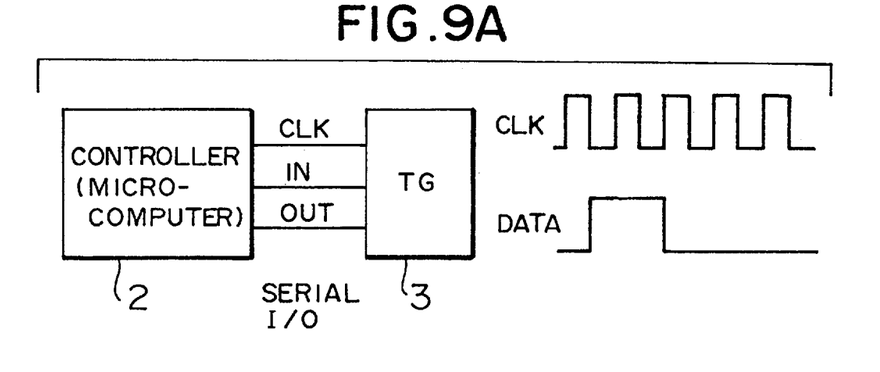
Figure 9B:
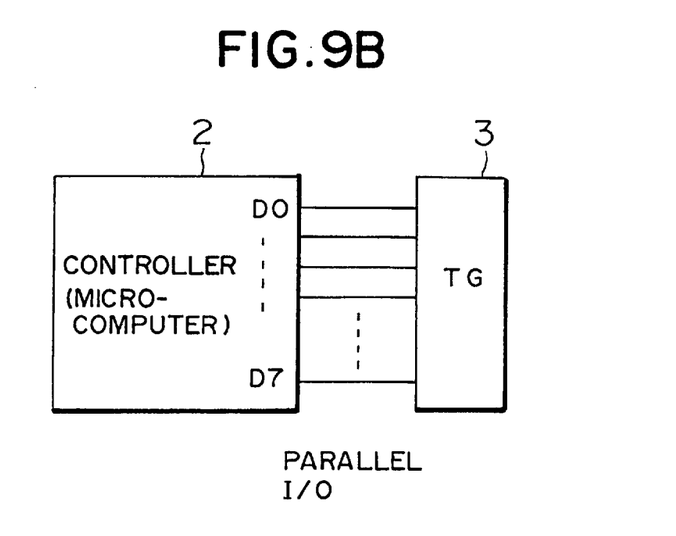

FIG. 9 illustrates an example of communication systems through which the controller 2 and the timing generator (TG) 3 are connected. FIG. 9A illustrates a serial data communication system in which data (DATA) can be transmitted and received via a three-wire serial interface through bilateral communications. Data communications of this type are made in synchronization with the clock signal CLK. After data communications have been made in the form of serial data, the data is converted to the form of parallel data in the timing generator 3 and is used for a controlling operation. FIG. 9B illustrates an example of parallel data communications. 8-bit data items DO, . . . , D7 are directly input into the timing generator 3 from the controller 2.

As will be clearly understood from the foregoing description, the present invention offers the following advantages. The timing generator supplies driving control timing signals to the display panel containing the built-in horizontal scanning circuit and the built-in vertical scanning circuit. For attaining this supply, the controller supplies adjustment information to the timing generator by such means of communications or the like, whereby the period of the horizontal clock signal and the phases of the horizontal start signals and the vertical start signals are made programmable. This makes it possible to construct a display device that is automatically operable with various types of VGA or data display systems. For example, approximately 100 types of various VGA formats (data synchronous formats) can be synchronously displayed by means of communications from the exterior controller. This synchronous display can be implemented merely by using the timing generator and the display panel, which eliminates the need for a scan converter and a field memory that have been conventionally required, thereby achieving cost reduction.

What is claimed is:

1. A display device deciphering various video formats and optimizing horizontal and vertical image centering on a display screen, said display device comprising:
   a controller connected to a source of incoming video signals for determining a standard of said incoming video signals and supplying adjustment information based on said standard
   a timing generator receiving said adjustment from said controller and a synchronizing signal, said timing generator generating a first and second timing signals in accordance with said adjustment information,
   said timing generator comprising:
      a frequency demultiplier which receives said adjustment information,
      a phase comparator which receives said synchronizing signal and a signal output from said frequency demultiplier,
      a low pass filter connected to an output of said phase comparator,
      a voltage controlled oscillator which receives an output signal from said low pass filter and which controls said frequency demultiplier, and
      vertical and horizontal clock generating circuits generating said first and second timing signals respectively, said horizontal clock generating circuit receiving said adjustment information and being controlled by said voltage controlled oscillator, said vertical clock generating circuit receiving said adjustment information and being controlled by said horizontal clock generating circuit; and
   a display panel comprising pixels arranged in a matrix, a vertical scanning circuit operable in response to said first timing signal for sequentially selecting respective pixel rows, and a horizontal scanning circuit operable in response to said second timing signal for controlling video signals supplied to selected pixel rows in accordance with said standard, to display the optimally-adjusted image.

2. A display device as claimed in claim 1, wherein said synchronizing signal is supplied to said timing generator from said incoming video signals.

3. A display device as claimed in claim 1, wherein said vertical scanning circuit sequentially selects said pixel rows in synchronization with said first timing signal.

4. A display device as claimed in claim 3, wherein said timing generator controls a phase of said first timing signal in accordance with said adjustment information.

5. A display device as claimed in claim 1, wherein said horizontal scanning circuit selects pixel columns to receive said incoming video signals in accordance with said second timing signal.

6. A display device as claimed in claim 5, wherein said timing generator controls a phase of said second timing signal in accordance with said adjustment information.

7. A display device as claimed in claim 5, further comprising a plurality of switches, each connected between a column of pixels of said display panel and said incoming video signals, wherein said horizontal scanning circuit selects a pixel column by closing the switch between said selected pixel column and the incoming video signals.

8. A display device as claimed in claim 5, wherein said timing generator controls a period of said second timing signal in accordance with said adjustment information so as to enable automatic adjustments to a circularity or linearity of an image being displayed on said display panel.

9. A display device as claimed in claim 5, wherein said horizontal scanning circuit selects said pixel columns sequentially.

10. A display device as claimed in claim 1, wherein said frequency demultiplier has a variable dividing ratio which is varied in accordance with said adjustment information to control a period of said second timing signal.

11. A display device as claimed in claim 1, wherein said frequency demultiplier comprises a plurality of stages of a binary counter which can be selectively utilized so that a dividing ratio of said demultiplier is made variable.

12. A method of driving a display device to accurately display images from video signals of different formats, said method comprising:
- determining a standard of incoming video signals with a controller connected to a source of said incoming video signals;
- supplying adjustment information based on said standard from said controller to a timing generator; and
- generating a first and second timing signals in accordance with said adjustment information, said generating being performed with a timing generator receiving said adjustment information from said controller and a synchronizing signal;
- wherein said timing generator comprises;
  - a frequency demultiplier which receives said adjustment information,
  - a phase comparator which receives said synchronizing signal and a signal output from said frequency demultiplier,
  - a low pass filter connected to an output of said phase comparator,
  - a voltage controlled oscillator which receives an output signal from said low pass filter and which controls said frequency demultiplier, and
  - vertical and horizontal clock generating circuits generating said first and second timing signals respectively, said horizontal clock generating circuit receiving said adjustment information and being controlled by said voltage controlled oscillator, said vertical clock generating circuit receiving said adjustment information and being controlled by said horizontal clock generating circuit.

13. A method as claimed in claim 2, further comprising displaying said incoming video signals with a display panel comprising pixels arranged in a matrix, said displaying comprising:
- sequentially selecting respective pixel rows with a vertical scanning circuit operable in response to said first timing signal; and
- controlling distribution of said incoming video signals to columns of said pixels with a horizontal scanning circuit operable in response to said second timing signal.

14. A method as claimed in claim 12, further comprising taking said synchronizing signal which is supplied to said timing generator from said incoming video signals.

15. A method as claimed in claim 12, further comprising sequentially selecting said pixel rows with said vertical scanning circuit in synchronization with said first timing signal.

16. A method as claimed in claim 15, further comprising controlling a phase of said first timing signal in accordance with said adjustment information.

17. A method as claimed in claim 12, further comprising sequentially selecting said pixel columns with said horizontal scanning circuit in synchronization with said second timing signal.

18. A method as claimed in claim 12, further comprising controlling a phase of said second timing signal in accordance with said adjustment information.

19. A method as claimed in claim 12, further comprising controlling a period of said second timing signal by varying a dividing ration of said frequency demultiplier in accordance with said adjustment information.

* * * * *